US012600186B2

(12) United States Patent (10) Patent No.: US 12,600,186 B2
Hiramatsu (45) Date of Patent: Apr. 14, 2026

(54) ARM MEMBER

(71) Applicant: SOMIC MANAGEMENT HOLDINGS INC., Tokyo (JP)

(72) Inventor: Katsuhiro Hiramatsu, Tokyo (JP)

(73) Assignee: SOMIC MANAGEMENT HOLDINGS INC., Tokyo (JP)

( * ) Notice: Subject to any disclaimer, the term of this patent is extended or adjusted under 35 U.S.C. 154(b) by 261 days.

(21) Appl. No.: 18/286,168

(22) PCT Filed: Jan. 27, 2022

(86) PCT No.: PCT/JP2022/003062
§ 371 (c)(1),
(2) Date: Oct. 9, 2023

(87) PCT Pub. No.: WO2022/239312
PCT Pub. Date: Nov. 17, 2022

(65) Prior Publication Data
US 2024/0198747 A1 Jun. 20, 2024

(30) Foreign Application Priority Data

May 14, 2021 (JP) ................................ 2021-082413

(51) Int. Cl.
*B60G 7/00* (2006.01)
*F16C 11/06* (2006.01)
(52) U.S. Cl.
CPC ............. *B60G 7/001* (2013.01); *B60G 7/005* (2013.01); *F16C 11/0695* (2013.01); *B60G 2204/416* (2013.01); *B60G 2206/7101* (2013.01)
(58) Field of Classification Search
CPC .............. B60G 7/005; B60G 2204/416; B60G 2206/7101; B60G 7/001; F16C 11/06–086; F16C 11/106; F16C 2326/05; Y10T 403/32196; Y10T 403/32204; Y10T 403/32311; Y10T 403/32631–32811
USPC ............................... 403/76, 77, 90, 122–144
See application file for complete search history.

(56) References Cited

U.S. PATENT DOCUMENTS

| | | | | |
|---|---|---|---|---|
| 5,609,433 A | * | 3/1997 | Pazdirek | F16C 11/0657 403/135 |
| 5,615,967 A | * | 4/1997 | Hellon | F16C 11/0642 403/133 |
| 5,641,235 A | * | 6/1997 | Maughan | F16C 11/0628 403/135 |

(Continued)

FOREIGN PATENT DOCUMENTS

| | | | | |
|---|---|---|---|---|
| DE | 102009014194 A1 | * | 9/2010 | ....... B60G 2204/416 |
| JP | 2013-002597 A | | 1/2013 | |
| JP | 2020-517515 A | | 6/2020 | |

OTHER PUBLICATIONS

International Search Report issued in International Application No. PCT/JP2022/003062 on Apr. 19, 2022.

*Primary Examiner* — Josh Skroupa
(74) *Attorney, Agent, or Firm* — TROUTMAN PEPPER LOCKE LLP

(57) ABSTRACT

An arm member allowing a ball joint to be held firmly in a hole part of a base material includes, a metallic base material, and a ball joint having a cylindrical housing. The base material has a hole part. The housing is inserted in the hole part. The housing includes an abutting part abutting on the base material in an axis direction at an edge position of the hole part.

2 Claims, 3 Drawing Sheets

(56)           References Cited

U.S. PATENT DOCUMENTS

| | | | | |
|---|---|---|---|---|
| 5,947,627 | A * | 9/1999 | Uneme | ............... F16C 11/0657 |
| | | | | 403/130 |
| 6,698,963 | B1 * | 3/2004 | Parker | ................. F16C 11/0609 |
| | | | | 403/130 |
| 7,938,417 | B2 * | 5/2011 | Ersoy | ..................... B60G 7/005 |
| | | | | 403/122 |
| 8,905,417 | B2 | 12/2014 | Kuroda | |
| 10,220,666 | B2 * | 3/2019 | Kuroda | ............... F16C 11/0633 |
| 11,179,992 | B2 * | 11/2021 | Kuroda | ............... F16C 11/0685 |
| 2010/0084834 | A1 | 4/2010 | Ersoy et al. | |
| 2019/0217679 | A1 * | 7/2019 | Kuroda | ................... F16C 11/06 |
| 2020/0114716 | A1 | 4/2020 | Ungruh et al. | |

* cited by examiner

ARM MEMBER

CROSS-REFERENCE TO RELATED APPLICATIONS

This application is a U.S. National Phase of International Patent Application No. PCT/JP2022/003062, filed on Jan. 27, 2022, which published as WO 2022/239312 A1 on Nov. 17, 2022, and claims priority to JP 2021-082413, filed on May 14, 2021, all of which are herein incorporated by reference in their entireties.

TECHNICAL FIELD

This invention relates to an arm member where a housing of a ball joint is fixed by being inserted in a hole part formed at a metallic base material.

BACKGROUND

In a conventionally-known suspension arm used in a suspension device of a vehicle such as an automobile, a metallic base material is reinforced with fiber-reinforced resin (FRP) for achieving both ensuring of strength and weight saving. This suspension arm has a ball joint to be connected to a connection target. The ball joint is attached by press-fitting a circular cylindrical housing into a circular hole part formed at a base material (see Japanese Laid-open Patent Publication (Translation of PCT Application) No. 2020-517515 (pp. 10 and 11, FIGS. 1-3), for example).

SUMMARY

However, as the ball joint is fixed by merely press-fitting the housing into the hole part in the above-described configuration, firmly fixing the ball joint is desired in response to application of high load to the ball joint. This problem also occurs at an arm member other than the suspension arm.

This invention has been made in view of the foregoing issue, and is intended to provide an arm member allowing a ball joint to be held firmly in a hole part of a base material.

An arm member includes: a metallic base material having a hole part; and a ball joint having a cylindrical housing inserted in the hole part, wherein the housing includes an abutting part abutting on the base material in an axis direction at an edge position of the hole part.

According to an arm member as recited herein, the arm member includes an outer shell made of fiber-reinforced resin arranged in such a manner as to cover at least a part of each of the base material and the housing of the ball joint.

According to an arm member as recited herein, the abutting part is a projection projecting outward from an outer surface of the housing.

According to an arm member as recited above the abutting part is formed at an intermediate portion of the housing in the axis direction.

According to the arm member as recited herein, the position of the housing relative to the base material is regulated by the abutting contact between the abutting part and the base material and load on the ball joint acting in the axis direction is received by the abutting part and the base material. This reduces the occurrence of coming-off of the ball joint from the base material to be caused by excessive load on the ball joint, making it possible to hold the ball joint firmly in the hole part of the base material.

In addition to the effect fulfilled by the arm member, it is possible to provide the arm member achieving both ensuring of strength and weight saving.

In addition to the effect fulfilled by the arm member as recited herein, formation of the abutting part is facilitated and the abutting part is allowed to easily abut on the base material at an edge of the hole part only by inserting the housing into the hole part.

In addition to the effect fulfilled by the arm member, the weight of the housing is not increased excessively by the abutting part to achieve excellent weight saving.

DETAILED DESCRIPTION

Figure 1:
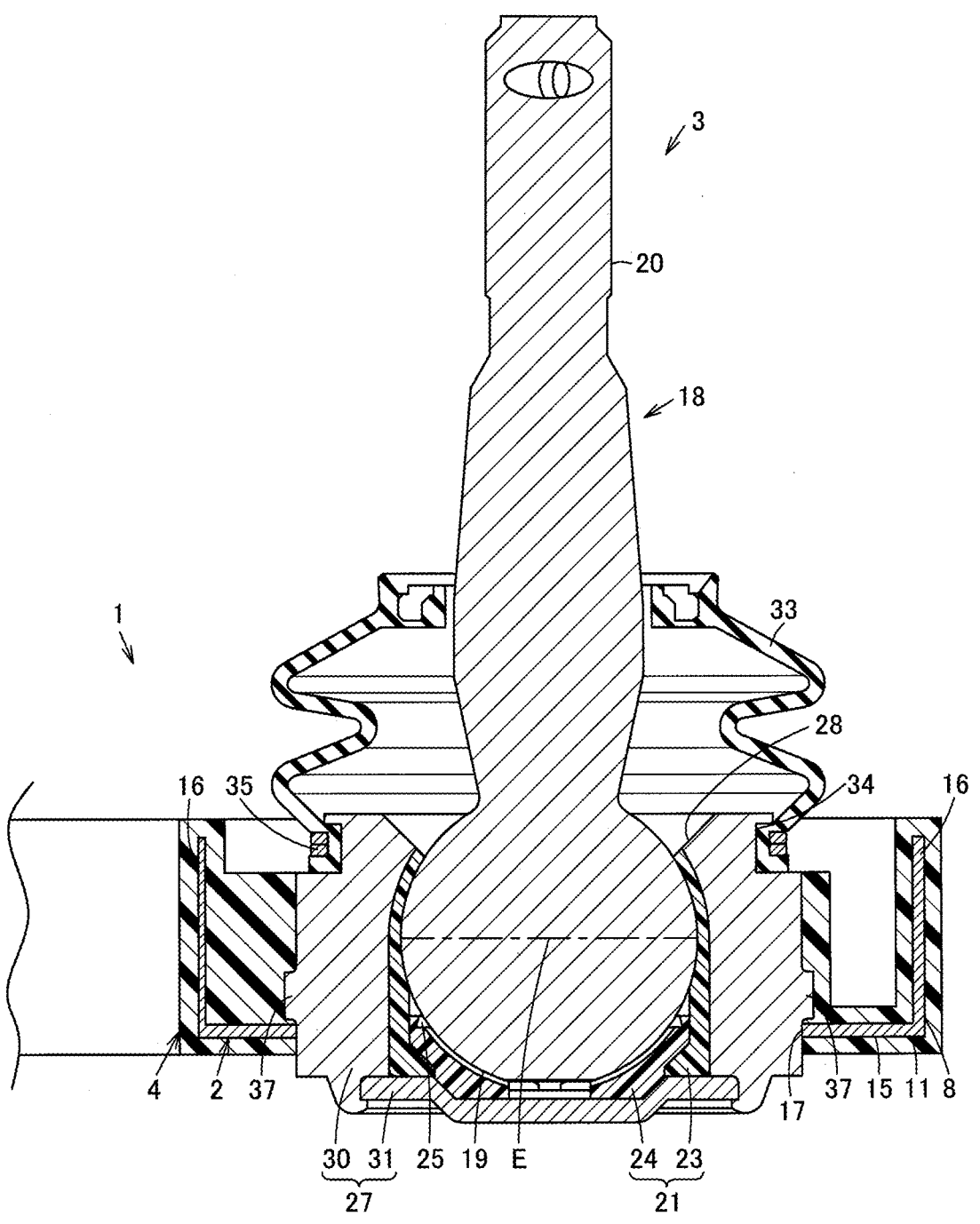
FIG. 1 is a sectional view showing a part of an arm member according to an embodiment of this invention.

An embodiment of this invention is described below by referring to the drawings.

Figure 3:
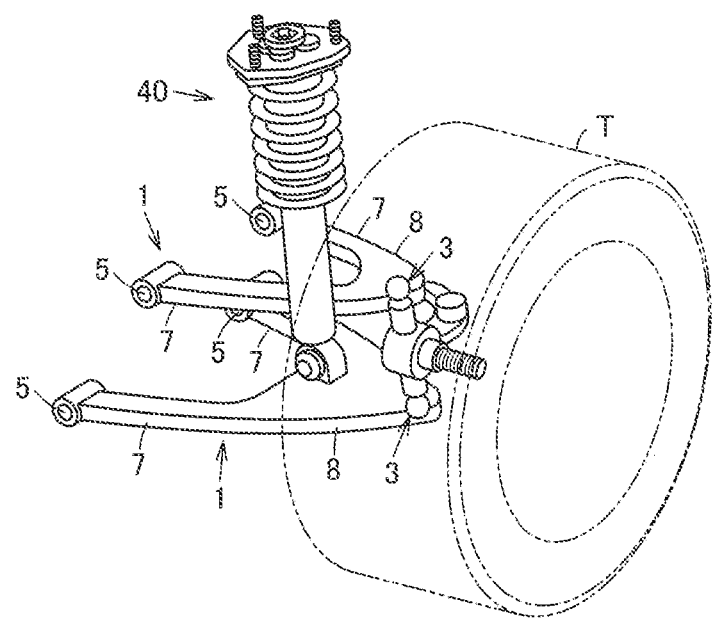
FIG. 3 is a perspective view schematically showing an example of a suspension device using the arm member.

Referring to FIG. 1, a reference number 1 denotes an arm member. In this embodiment, the arm member 1 is an arm member for a vehicle used in a suspension device or a steering device of an automobile, for example. The arm member 1 is a ball joint unit including a base material 2, and a ball joint 3 attached to the base material 2. In the example shown in the drawing, the arm member 1 further includes an outer shell 4 covering at least a part of each of the base material 2 and the ball joint 3. While the arm member 1 can be an arbitrary member, the arm member 1 of this embodiment is a suspension arm used as an upper arm or a lower arm of a double wishbone suspension including the ball joint 3 connected to a tire T side and a bush 5 connected to a vehicle body side as shown in FIG. 3, for example.

In this embodiment, the arm member 1 has arm parts 7 in a pair. These arm parts 7 have respective one end portions coupled to each other by a coupler 8, and respective opposite end portions of the arm parts 7 are free ends. The bush 5 is provided at each of the opposite end portions of the arm parts 7. Specifically, the arm member 1 shown in the drawing has a U-shape or V-shape outer appearance as a whole.

Figure 2A:
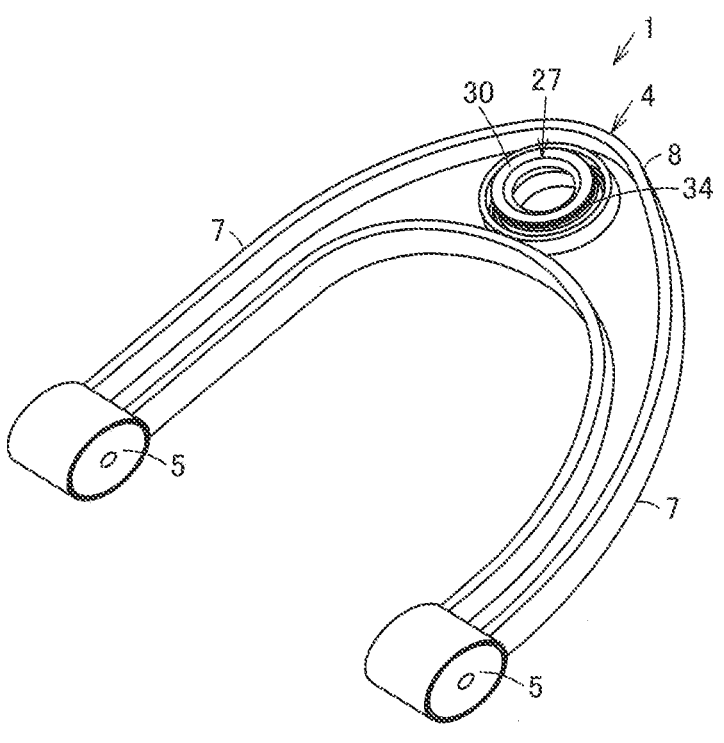
FIG. 2A is a perspective view of the arm member.
Figure 2B:
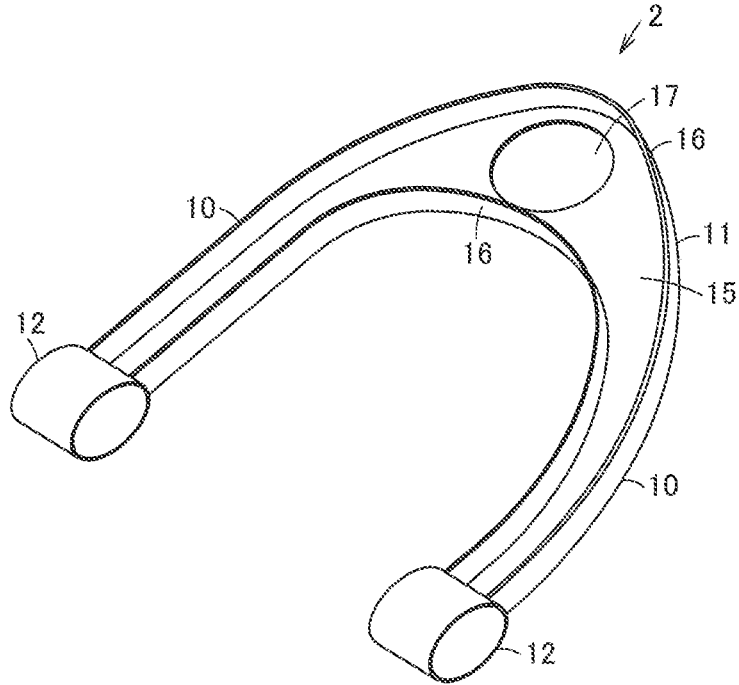
FIG. 2B is a perspective view of a base material of the arm member.

The base material 2 shown in FIGS. 1 and 2B is a metallic skeleton. The base material 2 is formed in conformity with the shape of the arm member 1. Specifically, in this embodiment, the base material 2 has base material arm parts 10 in a pair corresponding to the arm parts 7 in a pair. These base material arm parts 10 have respective one end portions coupled to each other by a base material coupler 11 corresponding to the coupler 8, and respective opposite end portions of the base material arm parts 10 are free ends. Furthermore, in this embodiment, a circular cylindrical ring part 12 to which the bush 5 (FIG. 2A) is to be attached is formed at the opposite end portion of the base material arm part 10. The ring part 12 is formed into a circular cylindrical shape and has an axis direction extending in a direction intersecting or perpendicular to a lengthwise direction of the base material arm part 10. The ring parts 12, 12 are arranged coaxially with each other.

The base material 2 is formed into a U-shape in a section having a base material body part 15 of a flat plate shape extending over a range from the base material arm part 10 to the base material coupler 11, and side wall parts 16 rising from opposite side edges of the base material body part 15. Furthermore, the base material body part 15 includes a hole part 17 located at the coupler 8 and to which the ball joint 3 is attached. The hole part 17 is formed into a round hole shape and penetrates the base material body part 15 in a thickness direction thereof.

The ball joint 3 includes a ball stud 18 as a ball-side member. The ball stud 18 is formed into a shaft-like shape using steel and the like, for example. The ball stud 18 has a ball part 19 formed at one end portion thereof, and a stud part 20 projecting in a shaft-like shape (circular columnar shape) from the ball part 19 toward the opposite end portion thereof. The stud part 20 is connected to an external connection target member not shown in the drawings. In the following, for clarity of the explanation, a vertical direction shown in FIG. 1 is described as a vertical direction in this embodiment. Meanwhile, the vertical direction in the arm member 1 is appropriately settable in response to an orientation or an angle of installation of the arm member 1.

The ball part 19 is rotatably held by a bearing sheet 21 as a sliding member. The bearing sheet 21 is formed into a circular cylindrical shape using synthetic resin. In this embodiment, the bearing sheet 21 has a two-piece configuration. Specifically, the bearing sheet 21 shown in the drawing has a first sheet member 23 and a second sheet member 24. The first sheet member 23 rotatably holds the ball part 19 in a range extending toward an upper side from an equator position E. Here, the equator position E of the ball part 19 is a position where the diameter of the ball part 19 is maximum in an axis direction of the ball stud 18. The second sheet member 24 is internally fitted in a lower end portion side of the first sheet member 23. The second sheet member 24 rotatably holds the ball part 19 in a range on a lower side from the equator position E. In the example shown in the drawing, the second sheet member 24 is provided with a storage 25 like a recess for a lubricant formed at a position on an inner periphery side facing an outer peripheral surface of the ball part 19.

The bearing sheet 21 is housed together with the ball part 19 in a housing 27 as a receiving-side member. The housing 27 is also called a socket and the like, and is a metallic member formed by forging or casting, for example. The housing 27 is formed into a circular cylindrical shape with a closed bottom having an opening part 28 at an upper end portion thereof. The housing 27 has an outer diameter dimension substantially equal to an inner diameter dimension of the hole part 17 of the base material 2 or slightly less than the inner diameter dimension of the hole part 17. Namely, the outer diameter dimension of the housing 27 is set equal to or less than the inner diameter dimension of the hole part 17.

In this embodiment, the housing 27 has a housing body part 30 as a circular cylindrical receiving-side member body part, and a plug 31 as a closing member swaged and fixed to the housing body part 30 and closing a lower end portion of the housing body part 30. By the presence of the housing body part 30 and the plug 31, the bearing sheet 21 is fitted to the interior of the housing 27 to form an inner chamber for housing and holding the bearing sheet 21. The housing 27 is inserted into the hole part 17 of the base material 2 from above to project downward at its lower end portion side relative to the base material body part 15 of the base material 2.

The opening part 28 is a part through which the stud part 20 of the ball stud 18 projects. The opening part 28 is covered by a dust cover 33. The dust cover 33 is formed into a circular cylindrical shape using an elastic member. The dust cover 33 is attached to both an outer peripheral surface of the housing body part 30 and the stud part 20 of the ball stud 18. The dust cover 33 has a lower end portion fixed to the housing body part 30 and an upper end portion contacting an outer peripheral surface of the stud part 20 under pressure. In the example shown in the drawing, the lower end portion of the dust cover 33 is fitted in an attachment groove 34 formed at the outer peripheral surface of the housing body part 30 and is fastened and fixed to the attachment groove 34 with a clip 35 as a fixing member having a shape like a circular ring.

An abutting part 37 is formed at the outer peripheral surface of the housing 27 (housing body part 30). The abutting part 37 abuts on the base material 2 in an axis direction, namely, in the vertical direction at an edge position of the hole part 17. The abutting part 37 is a projection formed in such a manner as to project in a radial direction from the outer peripheral surface of the housing 27 (housing body part 30). Specifically, by the presence of the abutting part 37, the outer peripheral surface of the housing 27 (housing body part 30) is formed into a step-like shape in the axis direction. In this embodiment, the abutting part 37 is formed in such a manner as to project in a step-like shape at each of upper and lower end portions thereof relative to the outer peripheral surface of the housing 27 (housing body part 30). The abutting part 37 has an outer diameter dimension set greater than the inner diameter dimension of the hole part 17 of the base material 2. An edge of the hole part 17 of the base material 2 (base material body part 15) abuts on the lower end portion of the abutting part 37. The housing 27 (housing body part 30) on the upper side from the lower end portion of the abutting part 37 projects upward relative to the base material body part 15. The abutting part 37 is fixed to the base material 2 (base material body part 15) by arbitrary means such as welding.

In the example shown in the drawing, the abutting part 37 is located at a central portion of the housing 27 (housing body part 30) in the vertical direction, which is the axis direction thereof. Specifically, the abutting part 37 has a vertical dimension set less than the dimension of the housing 27 (housing body part 30) in the axis direction, namely, in the vertical direction. Namely, the abutting part 37 is formed at an intermediate portion of the housing 27 (housing body part 30) in the axis direction. In this embodiment, the abutting part 37 is located on the lower side from the central portion of the housing 27 (housing body part 30) in the vertical direction, which is the axis direction thereof. In the example shown in the drawing, the abutting part 37 as a whole is located below the equator position E of the ball part 19.

As shown in FIGS. 1 and 2A, the outer shell 4 is made of fiber-reinforced resin. For example, carbon fiber is used preferably as the fiber. In this embodiment, the outer shell 4 covers an entire surface of the base material 2 and further covers the housing 27 (housing body part 30) of the ball joint 3 in a range below the attachment groove 34 and in a range to a position above the base material body part 15 of the base material 2. Specifically, the outer shell 4 is formed into a U-shape in a section covering the base material body part 15 and the side wall part 16 of the base material 2. Furthermore, in this embodiment, the outer shell 4 covers the ring part 12 on its outer peripheral side. The outer shell 4 does not cover the housing 27 of the ball joint 3 in a range projecting downward relative to the base material 2.

In the arm member 1, the bearing sheet 21 rotatably holding the ball part 19 is attached to the inner chamber at the housing 27 of the ball joint 3 and the housing 27 is inserted into the hole part 17 of the base material 2 formed in advance by press forming, for example. At this time, the abutting part 37 formed at the housing 27 abuts on the edge of the hole part 17, thereby determining the position of the housing 27. In this state, the abutting part 37 of the housing 27 is fixed to the base material 2 by welding, for example, thereby forming an intermediary body. Next, the intermediary body is placed in a forming die and the outer shell 4 is formed in such a manner as to cover the base material 2 and a part of the housing 27. Then, the dust cover 33 is attached to both the ball stud 18 and the housing 27, thereby completing formation of the arm member 1.

As shown in FIG. 3, in this embodiment, the arm member 1 is arranged at a lower end portion of a shock absorber 40 in such a manner as to pass the shock absorber 40 between the arm parts 7, 7, and is attached in such a manner as to connect the stud part 20 of the ball stud 18 of the ball joint 3 to the tire T side and connect the bush 5 to the vehicle body side.

In this way, the abutting part 37 to abut on the base material 2 in the axis direction at the edge position of the hole part 17 is formed at the housing 27 of the ball joint 3 to be inserted into the hole part 17 formed at the metallic base material 2. By doing so, the position of the housing 27 relative to the base material 2 is regulated by the abutting contact between the abutting part 37 and the base material 2 and load on the ball joint 3 acting in the axis direction is received by the abutting part 37 and the base material 2. This reduces the occurrence of coming-off of the ball joint 3 from the base material 2 to be caused by excessive load on the ball joint 3, making it possible to hold the ball joint 3 firmly in the hole part 17 of the base material 2.

In particular, if the arm member 1 is a suspension arm used in a suspension device, large load is applied in the vertical direction during rotating motion or bouncing motion of an automobile. In response to this, by regulating the position of the housing 27 using the abutting part 37, the ball joint 3 can be held reliably at the base material 2 in response to such large load in the vertical direction.

The outer shell 4 made of fiber-reinforced resin is formed in such a manner as to cover at least a part of each of the base material 2 and the housing 27 of the ball joint 3. As a result, it is possible to provide the arm member 1 achieving both ensuring of strength and weight saving.

The abutting part 37 is formed as a projection projecting outward from an outer surface of the housing 27. This facilitates formation of the abutting part 37 and allows the abutting part 37 to easily abut on the base material 2 at the edge of the hole part 17 only by inserting the housing 27 into the hole part 17.

The abutting part 37 is formed at the intermediate portion of the housing 27 in the axis direction. Thus, the weight of the housing 27 is not increased excessively by the abutting part 37 to achieve excellent weight saving.

In the above-described embodiment, as long as the abutting part 37 is formed in such a manner that at least the lower end portion thereof abuts on the hole part 17 from above, the abutting part 37 can be formed into any shape at an upper end portion side thereof.

Use of the arm member 1 is not limited to a suspension device or a steering device of a vehicle but the arm member 1 can be used in an arbitrary device.

INDUSTRIAL APPLICABILITY

This invention is preferably used in a suspension device of an automobile, for example.

The invention claimed is:

1. An arm member comprising:
a metallic base material comprising a base material body part and a hole part; and
a ball joint comprising a cylindrical housing with one end portion side in the axial direction inserted in the hole part, and
an outer shell made of fiber-reinforced resin arranged in such manner as to cover at least a part of each of the base material body part and the housing of the ball joint, wherein
the housing comprises an abutting part projecting outward from an outer surface, and the abutting part is formed at an intermediate portion of the housing in the axis direction and closer to one end portion than the central portion in the axial direction, and one end portion side of the abutting part abuts against the base material in an axis direction at an edge position of the hole part; the outer shell encloses the base material body part and covers an area extending, from the base material body part, beyond the opposite end portion side of the abutting part on the outer surface of the housing, toward the opposite end portion side beyond the central portion in the axial direction of the housing.

2. The arm member according to claim 1,
wherein: the ball joint has a dust cover covering the opposite end portion side of the housing in the axial direction, the housing has an attachment groove on the outer surface of the housing body part to which one end portion side of the dust cover is attached; the attachment groove is formed closer to the opposite end portion than the central portion of the housing body part in the axial direction; and the outer shell encloses the base material body part and covers an area extending, from the base material body part, beyond the opposite end portion side of the abutting part on the outer surface of the housing, toward the one end portion side of the housing in the axial direction beyond the attachment groove.

\* \* \* \* \*